United States Patent
Kim et al.

(10) Patent No.: US 10,609,734 B2
(45) Date of Patent: Mar. 31, 2020

(54) METHOD AND APPARATUS FOR DETECTING RACH PREAMBLE ON BASIS OF PLURALITY OF ZERO-CORRELATION ZONES IN WIRELESS COMMUNICATION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 15/553,972

(22) PCT Filed: Mar. 7, 2016

(86) PCT No.: PCT/KR2016/002262
§ 371 (c)(1),
(2) Date: Aug. 25, 2017

(87) PCT Pub. No.: WO2016/140558
PCT Pub. Date: Sep. 9, 2016

(65) Prior Publication Data
US 2018/0077730 A1    Mar. 15, 2018

Related U.S. Application Data

(60) Provisional application No. 62/129,016, filed on Mar. 5, 2015.

(51) Int. Cl.
*H04W 74/08* (2009.01)
*H04J 13/00* (2011.01)
(Continued)

(52) U.S. Cl.
CPC ..... *H04W 74/0833* (2013.01); *H04J 13/0055* (2013.01); *H04L 5/0053* (2013.01); *H04W 56/0005* (2013.01)

(58) Field of Classification Search
None
See application file for complete search history.

(56) References Cited

U.S. PATENT DOCUMENTS

| | | | | |
|---|---|---|---|---|
| 2008/0194259 A1* | 8/2008 | Vujcic | | H04W 74/0866 455/435.1 |
| 2008/0318567 A1* | 12/2008 | Popovic | | H04L 27/2655 455/422.1 |

(Continued)

FOREIGN PATENT DOCUMENTS

WO    2012173428    12/2012

OTHER PUBLICATIONS

PCT International Application No. PCT/KR2016/002262, Written Opinion of the International Searching Authority dated Jun. 29, 2016, 4 pages.

(Continued)

*Primary Examiner* — Duc T Duong
(74) *Attorney, Agent, or Firm* — Lee Hong Degerman Kang & Waimey

(57) ABSTRACT

Provided are a method and an apparatus for detecting a random access channel (RACH) preamble on the basis of a plurality of zero-correlation zones (ZCZ) in a wireless communication system. A user equipment (UE) transmits a RACH preamble, generated using a combination of a plurality of sequences corresponding to a plurality of zero-correlation zones, to an evolved NodeB (eNB). The evolved NodeB (eNB) detects a plurality of peaks from the RACH preamble and transmits a random access response to the UE.

11 Claims, 22 Drawing Sheets

(51) Int. Cl.
*H04L 5/00* (2006.01)
*H04W 56/00* (2009.01)

(56) References Cited

U.S. PATENT DOCUMENTS

| | | | | |
|---|---|---|---|---|
| 2009/0225701 | A1* | 9/2009 | Kwon | H04L 1/0006 370/328 |
| 2010/0034155 | A1* | 2/2010 | Noh | H04W 74/004 370/329 |
| 2010/0054235 | A1* | 3/2010 | Kwon | H04J 13/16 370/350 |
| 2010/0074372 | A1* | 3/2010 | Mauritz | H04J 13/0055 375/319 |
| 2010/0278137 | A1* | 11/2010 | Kwon | H04J 13/0059 370/330 |
| 2011/0249549 | A1* | 10/2011 | Hao | H04J 13/0062 370/208 |
| 2012/0002617 | A1* | 1/2012 | Vujcic | H04W 74/002 370/329 |
| 2012/0069933 | A1* | 3/2012 | Hao | H04W 74/0866 375/308 |
| 2013/0223241 | A1* | 8/2013 | Zhang | H04L 27/26 370/252 |
| 2014/0376495 | A1 | 12/2014 | Noh et al. | |

OTHER PUBLICATIONS

Samsung, "Using Restricted Preamble Set for RACH in High Mobility Environments," 3GPP TSG-RAN WG1 #49bis, R1-073168, Jun. 2007, 12 pages.

Huawei, "Specification of restricted set of cyclic shifts of root Zadoff-Chu sequences," TSG-RAN WG1 #50, R1-073516, Aug. 2007, 8 pages.

\* cited by examiner

METHOD AND APPARATUS FOR DETECTING RACH PREAMBLE ON BASIS OF PLURALITY OF ZERO-CORRELATION ZONES IN WIRELESS COMMUNICATION SYSTEM

CROSS-REFERENCE TO RELATED APPLICATIONS

This application is the National Stage filing under 35 U.S.C. 371 of International Application No. PCT/KR2016/002262, filed on Mar. 7, 2016, which claims the benefit of U.S. Provisional Application No. 62/129,016, filed on Mar. 5, 2015, the contents of which are all hereby incorporated by reference herein in its entirety.

BACKGROUND OF THE INVENTION

Field of the Invention

The present invention relates to wireless communications, and more particularly, to a method and apparatus for detecting a random access channel (RACH) preamble based on a plurality of zero-correlation zones in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In 3GPP LTE, a random access procedure may be performed. A major use of the random access procedure is uplink (UL) initial access and the transmission of a short message. In wideband code division multiple access (WCDMA), initial network access and the transmission of a short message are performed through the random access procedure. In contrast, in 3GPP LTE, a short message is not transmitted through the random access procedure. Furthermore, in 3GPP LTE, a random access channel (RACH) for the random access procedure may be transmitted separately from an UL data transmission channel More specifically, in 3GPP LTE, the random access procedure may be performed in the following cases.

(1) A UE in radio resource control (RRC) connected state (RRC_CONNECTED), but not uplink-synchronized, needing to send new UL data or control information (e.g. an event-triggered measurement report)
(2) A UE in RRC_CONNECTED, but not uplink-synchronized, needing to receive new downlink (DL) data, and therefore to transmit corresponding acknowledgement/non-acknowledgement (ACK/NACK) in the UL
(3) A UE in RRC_CONNECTED, handing over from its current serving cell to a target cell
(4) For positioning purposes in RRC_CONNECTED, when timing advance is needed for UE positioning
(5) A transition from RRC idle state (RRC_IDLE) to RRC_CONNECTED, for example for initial access or tracking area updates
(6) Recovering from radio link failure In general, a UE that has not obtained UL synchronization or has not maintained UL synchronization obtains UL timing synchronization using a random access procedure. If the UL synchronization of a UE has been obtained, an evolved NodeB (eNB) may schedule transmission resources with orthogonality. A UE may perform UL transmission only when UL synchronization has been formed between the UE and a BS and receive scheduling for data transmission from the eNB. That is, through the random access procedure, a UE that has not been synchronized may perform wireless access using a transmission scheme that is orthogonal or that is not overlapped to a maximum extent.

In the random access procedure, the UE transmits a RACH preamble to the eNB. A conventional RACH preamble is generally designed to perform RACH preamble ID detection based on a single zero-correlation zone. If two or more distinct correlation peaks are detected in a specific single zero-correlation zone, a RACH preamble collision may be detected. Therefore, using the RACH preamble based on the single zero-correlation zone makes it difficult to increase the detection probability of the RACH preamble for a specific UE.

SUMMARY OF THE INVENTION

The present invention provides a method and apparatus for detecting a random access channel (RACH) preamble based on a plurality of zero-correlation zones. The present invention provides a specific method for improving a structure of the RACH preamble used in the existing random access procedure so as to provide priority connection support with considering a service type and urgency of the UE. The present invention provides a method of preferentially supporting uplink synchronization acquisition by a specific user via a new RACH preamble detected in a plurality of zero-correlation zones.

In an aspect, a method for detecting a random access channel (RACH) preamble by an evolved NodeB (eNB) in a wireless communication system is provided. The method includes detecting, by the eNB, a plurality of peaks from a RACH preamble. The RACH preamble is generated, by a user equipment (UE), using a combination of a plurality of sequences corresponding to a plurality of zero-correlation zones (ZCZ), and the RACH preamble is transmitted from the UE to the eNB. The method includes transmitting, by the eNB, a random access response to the UE.

In another aspect, a method for transmitting a random access channel (RACH) preamble by a user equipment (UE) in a wireless communication system is provided. The method includes transmitting, by the UE, a RACH preamble to an evolved NodeB (eNB). The RACH preamble is generated, by the UE, using a combination of a plurality of sequences corresponding to a plurality of zero-correlation zones (ZCZ). The method includes receiving, by the UE, a random access response from the eNB.

The present invention preferentially supports uplink synchronization acquisition by a specific user.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
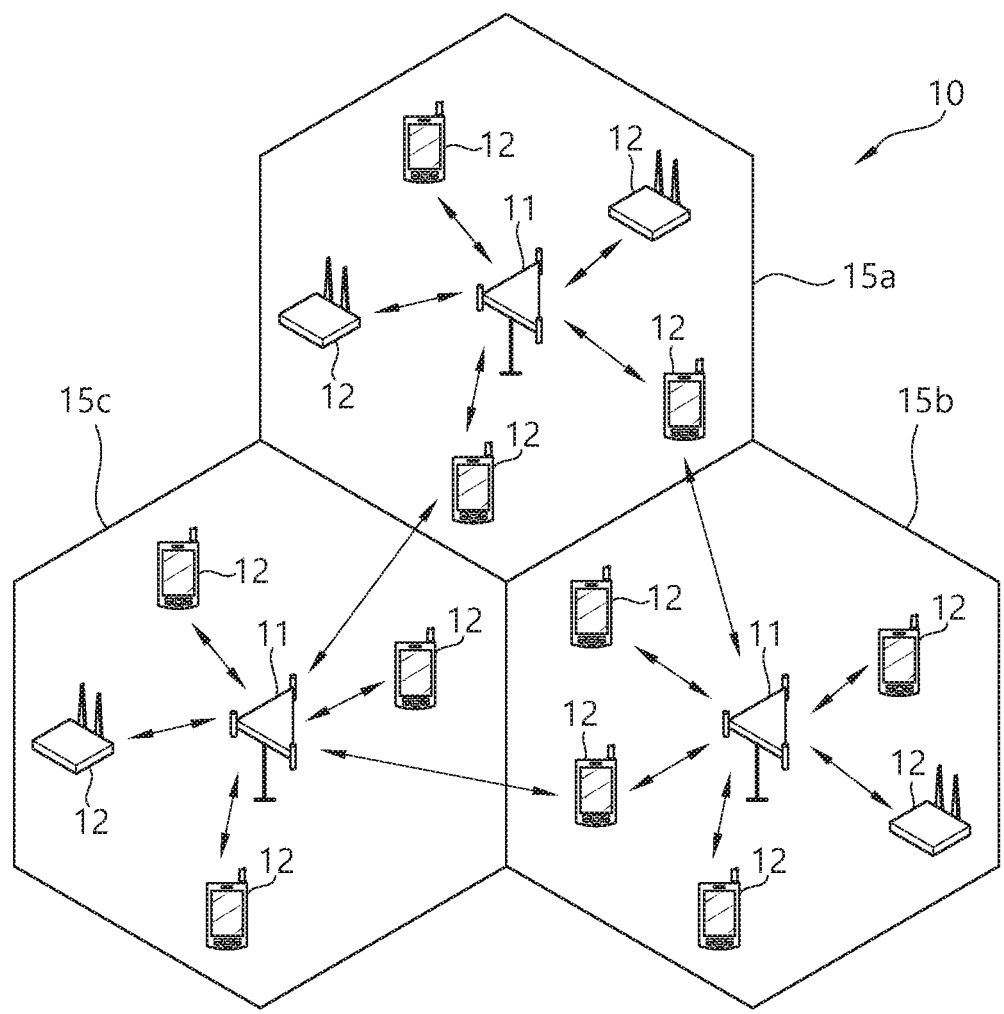
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. An eNB providing a communication service to the serving cell is called a serving eNB. The cellular system includes a different cell adjacent to the serving cell. The different cell adjacent to the serving cell is called a neighbor cell. An eNB providing a communication service to the neighbor cell is called a neighbor eNB. The serving cell and the neighbor cell are relatively determined based on a UE.

This technique can be used for downlink (DL) or uplink (UL). In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
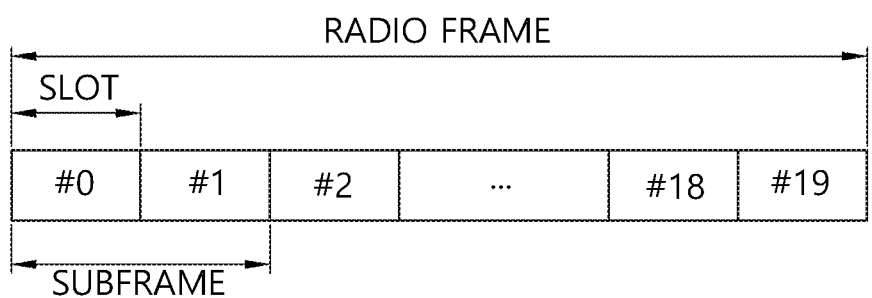
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
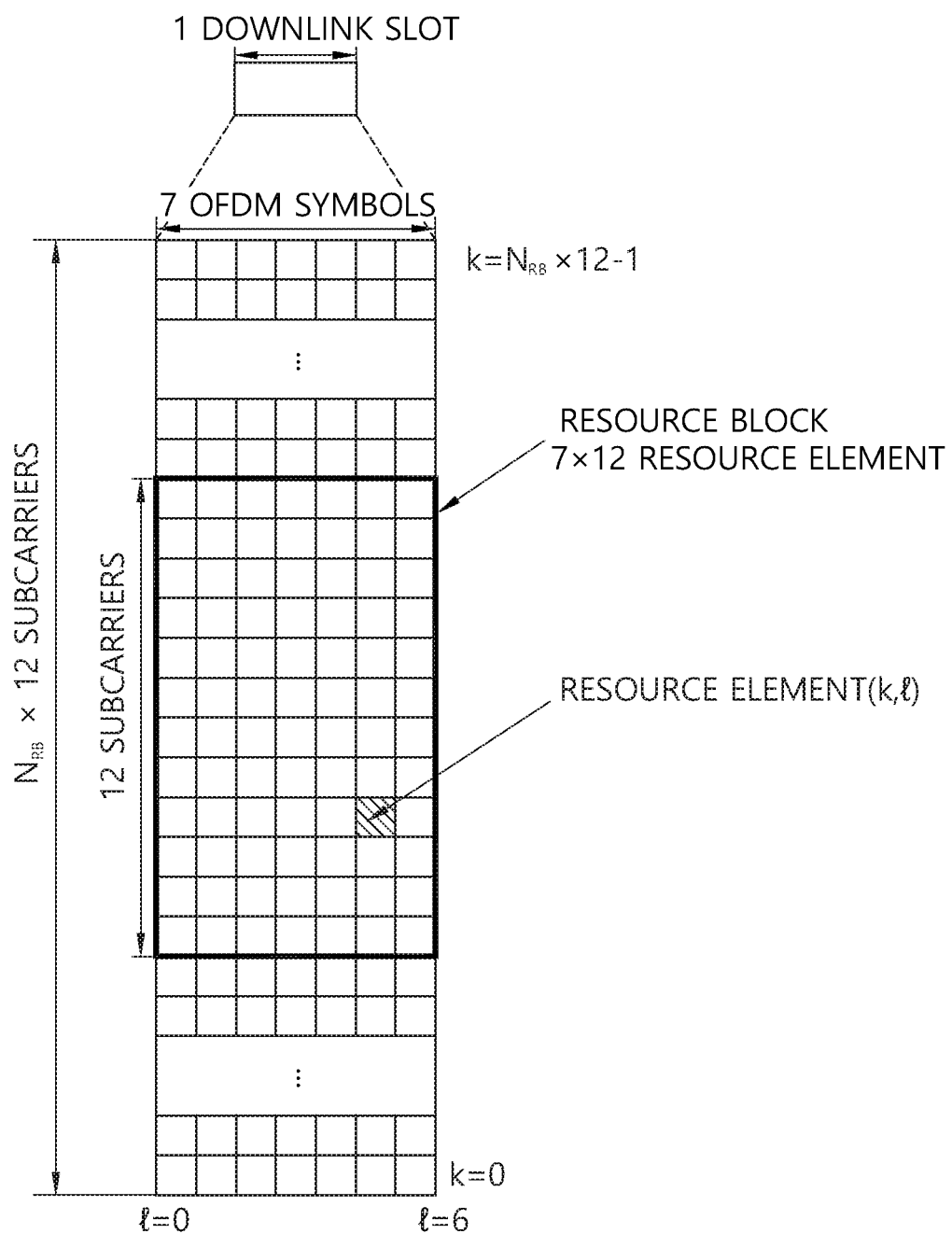
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a cyclic prefix (CP), frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
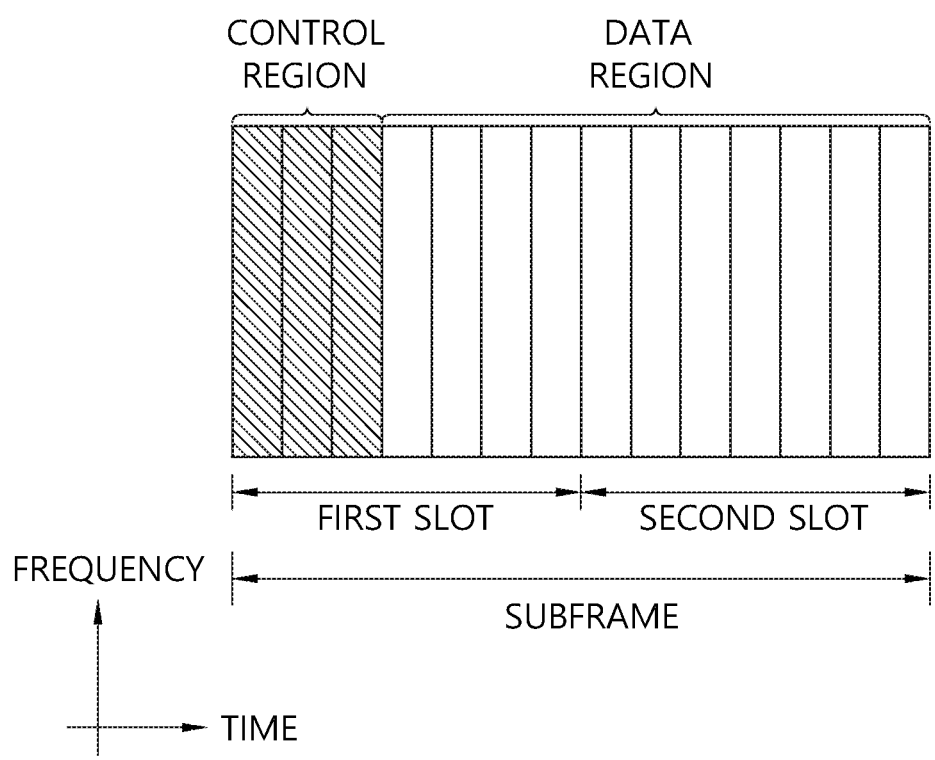
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining 01-DM symbols correspond to a data region to be assigned with a physical downlink shared chancel (PDSCH). Examples of DL control channels used in the 3GPP LTE may include a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
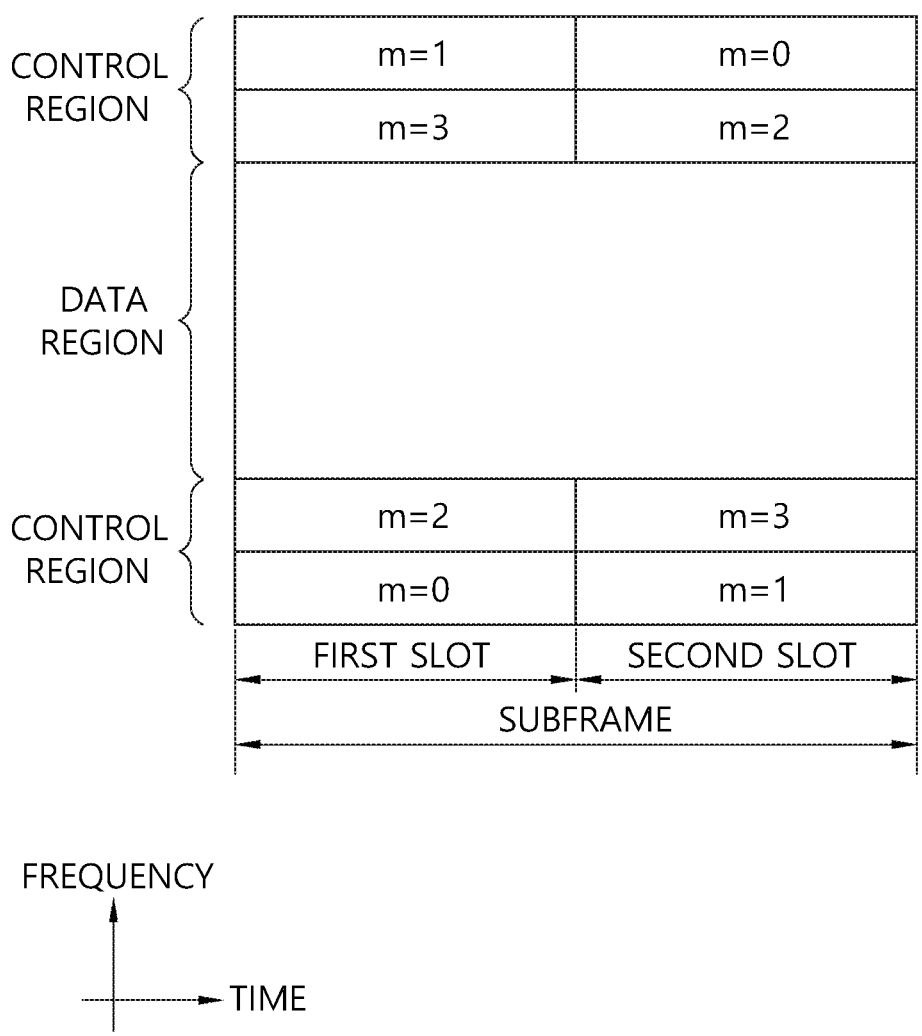
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR) which is a request for UL radio resource allocation, and the like. The PUSCH is mapped to a UL-SCH, a transport channel UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

A random access procedure may be divided into a contention-based random access procedure and a non-contention-based random access procedure. First, in the contention-based random access procedure, different UEs are permitted to simultaneously access an eNB using the same RACH preamble. Accordingly, a contention may occur. In order to process such a contention, an additional contention resolution step is required.

Figure 6:
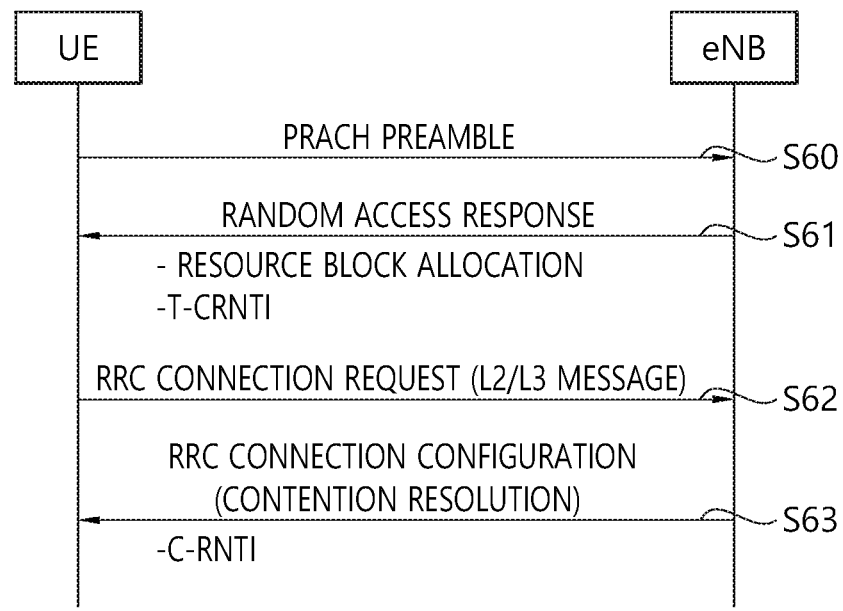
FIG. 6 shows a contention-based random access procedure.

FIG. 6 shows a contention-based random access procedure.

At step S60, a UE transmits an RACH preamble to an eNB. The RACH preamble may be called a "message 1". The RACH preamble may include an RA-RNTI. The RA-RNTI may be determined as (1+t_id+10*f_id). t_id is the index of the first subframe of the specified physical random access channel (PRACH) (0≤t_id<10), and f_id is the index of the specified PRACH within that subframe, in ascending order of frequency domain (0<f_id<6). The eNB may obtain the RA-RNTI by decoding the RACH preamble.

At step S61, the eNB transmits a random access response to the UE. The random access response may be called a "message 2". The random access response may include the RA-RNTI obtained by decoding the RACH preamble by the eNB, a TA, a temporary C-RNTI, and a resource block assignment (i.e., an UL grant for an L2/L3 message). The UE may obtain the resource block assignment and a modulation and coding scheme (MCS) configuration by decoding the random access response. The eNB may be configured to receive an RRC connection request message through the DCI format 0.

At step S62, the UE transmits an L2/L3 message, that is, an RRC connection request message, to the eNB. The RRC connection request message may be called a "message 3". The UE may transmit the RRC connection request message using the temporary C-RNTI obtained from the random access response.

At step S63, if the RRC connection request message transmitted by the UE has been successfully decoded, the eNB transmits HARQ ACK to the corresponding UE. Accordingly, the UE may be aware that the random access procedure has been successful. Such a process is called a contention resolution process. More specifically, the eNB transmits an RRC connection setup message to the UE using the temporary C-RNTI in response to the RRC connection request message. The RRC connection setup message may be called a "message 4". The RRC connection setup message may include a C-RNTI. From this point of time, the UE and the eNB may exchange messages using the C-RNTI.

If the UE has not received the HARQ ACK, the UE may return to step S60 and transmit the RACH preamble to the eNB.

In a non-contention-based random access procedure, a contention is not permitted for a reason of timing restriction. An eNB may indicate that each UE has to transmit which RACH preamble when. To this end, a UE has to be in a connected state (RRC_CONNECTED) prior to the random access procedure. For example, a non-contention-based random access procedure may be performed during handover. In the non-contention-based random access procedure, first, an eNB transmits an RACH preamble assignment to a UE. The UE transmits an RACH preamble, including an RA-RNTI and an indication of the size of an L2/L3 message, to the eNB based on the received RACH preamble assignment. The eNB that has received the RACH preamble transmits a random access response, including a TA, a C-RNTI, and an UL grant for an L2/L3 message, to the UE. Accordingly, the non-contention-based random access procedure may be completed.

Figure 7:
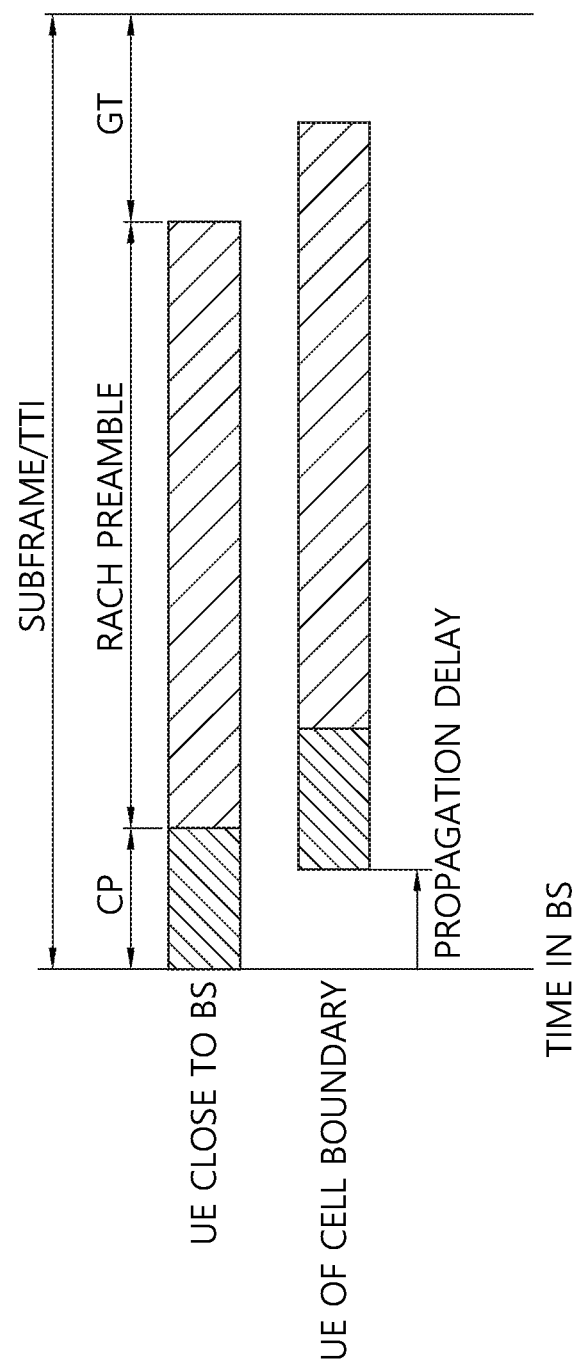
FIG. 7 shows an example of a structure of an RACH preamble.

FIG. 7 shows an example of a structure of an RACH preamble. Referring to FIG. 7, the RACH preamble consists of a CP, a sequence, and a guard time (GT). The CP absorbs maximum channel delay spread and a round trip time (RTT), and the GT absorbs the RTT. The CP is generated by inserting the latter part of an existing OFDM symbol into the CP interval of the RACH preamble. Accordingly, a periodic correlation in an eNB that receives the RACH preamble may be possible. A UE may transmit an RACH preamble, assuming that it has been synchronized with the eNB (i.e., a timing advance (TA)=0 ms). Accordingly, an RACH preamble transmitted by a UE close to the eNB is received by the eNB without a delay, and an RACH preamble transmitted by a UE distant from the eNB is received by the eNB with a propagation delay. In this case, the eNB may perform a random access procedure depending on the location where the RACH preamble transmitted by each UE was detected through a periodic correlation because it is aware of a sequence transmitted by each UE.

Several sequences may be used for an RACH preamble. Representatively, an auto-correlation-based Zadoff-Chu (ZC) sequence and a cross-correlation-based pseudo-random sequence may be used for an RACH preamble. In general, the auto-correlation-based sequence may be used in a situation in which intra-cell interference is small, and the cross-correlation sequence may be used in a situation in which intra-cell interference is great. In 3GPP LTE, a ZC sequence of 839 in length may be used for an RACH preamble. The ZC sequence used for the RACH preamble may satisfy the following conditions.

Intra-cell interference between different RACH preambles using the same frequency-time RACH resources is relatively small.

Intra-cell interference may be optimized depending on the size of a cell. That is, in order to improve detection performance of an eNB, more orthogonal preambles may be generated for a smaller cell.

Detection performance is improved as the number of orthogonal preambles is increased. (3GPP LTE is 64 signatures, and WCDMA is 16 signatures)

Detection complexity of an eNB is relatively small.

A high-speed UE can be supported.

When intra-cell interference between signatures is great, a PN sequence may be used for an RACH preamble.

A constant amplitude zero auto-correlation (CAZAC) sequence is described below.

Figure 8:
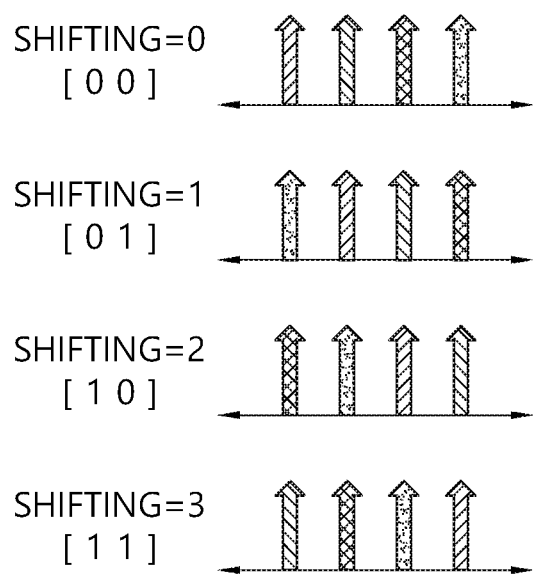
FIG. 8 shows an example of a CAZAC sequence set.

FIG. 8 shows an example of a CAZAC sequence set. Referring to FIG. 8, each sequence within the CAZAC sequence set has a different cyclic shifting (0, 1, 2, or 3). Furthermore, each sequence within the CAZAC sequence set is mapped to specific bits. In this case, each sequence becomes a single signature having specific information. Referring to FIG. 8, [0 0] is mapped to a sequence having a cyclic shifting of 0, [0 1] is mapped to a sequence having a cyclic shifting of 1, [1 0] is mapped to a sequence having a cyclic shifting of 2, and [1 1] is mapped to a sequence having a cyclic shifting of 3, respectively. That is, in FIG. 8, a transmitter may transmit information of 2 bits.

When the transmitter transmits a single sequence within a CAZAC sequence set, a receiver may identify the sequence and determine information mapped to a corresponding sequence. For example, when the receiver identifies the sequence having the cyclic shifting of 0, it may be aware that the transmitter has transmitted information of [0 0]. Assuming an additive white Gaussian noise (AWGN) channel and an environment not including a noise, the receiver may identify a transmitted sequence by finding an output value having the greatest size.

Performance of the CAZAC sequence set defined in FIG. 8 may be greatly deteriorated in a multi-path environment. In order to solve such a problem, in commercialized systems, such as 3GPP LTE, a CAZAC sequence set may be defined by taking into consideration a zero-correlation zone (ZCZ), that is, a valid delay period.

Figure 9:
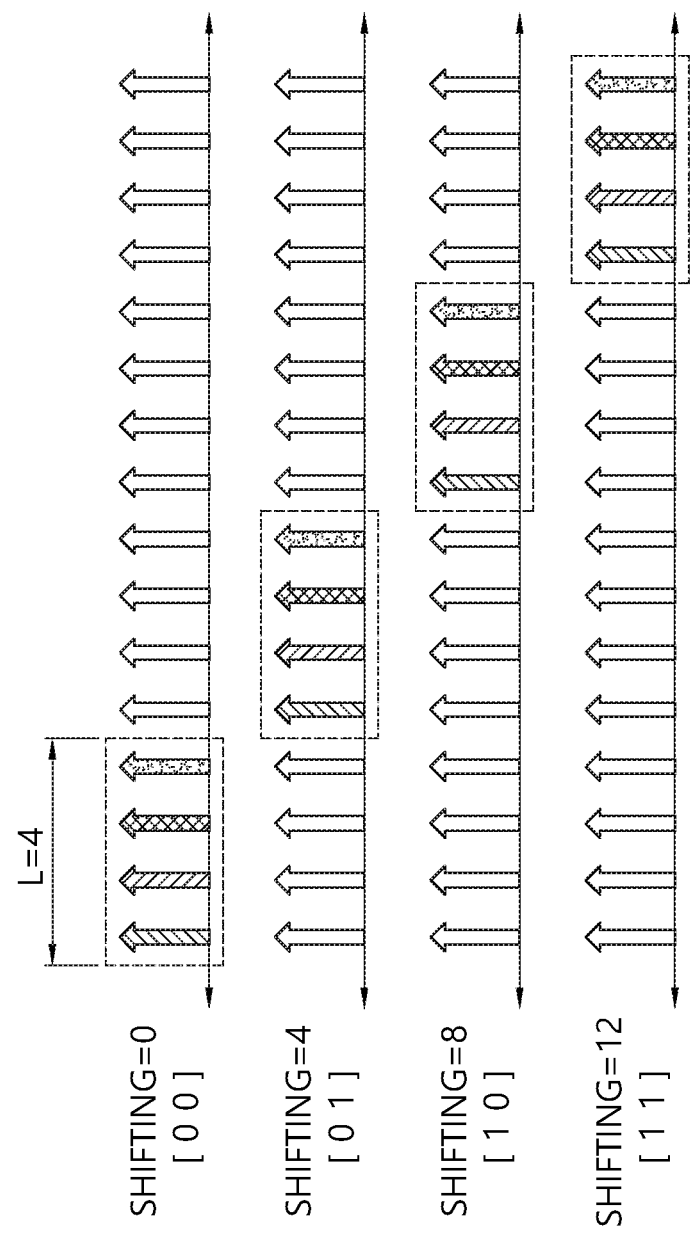
FIG. 9 shows another example of a CAZAC sequence set.

FIG. 9 shows another example of a CAZAC sequence set. Referring to FIG. 9, each sequence within the CAZAC sequence set has a different cyclic shifting (0, 4, 8, or 12). That is, compared to the CAZAC sequence set of FIG. 8, each sequence within the CAZAC sequence set of FIG. 9 is generated by setting an interval between cyclic shiftings to 4. In this case, the interval may be determined by a channel valid delay period L (i.e., the location of the last tap of a channel in a time axis).

Figure 10:
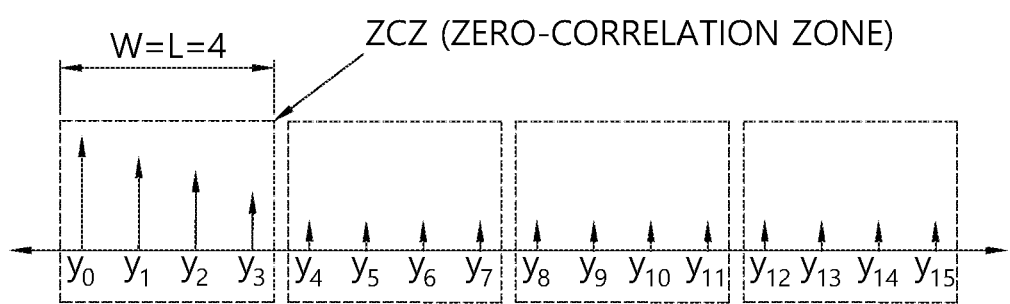
FIG. 10 shows an example of output of a receiver that has receives a sequence within a CAZAC sequence set.

FIG. 10 shows an example of output of a receiver that has receives a sequence within a CAZAC sequence set. FIG. 10 corresponds to the output of the receiver that has received a sequence having a cyclic shifting of 0 in FIG. 9, assuming an environment not including a receiver noise. Referring to FIG. 10, the size W of a ZCZ may be determined to a maximum of cyclic shifting (=L) of a sequence. A receiver first selects the greatest output value $y_i$ in each of ZCZs one by one, performs a comparison on the selected output values $y_i$ and selects a ZCZ having the greatest output value. That is, the receiver may select the first ZCZ. Four output values $\{y_0, y_1, y_2, y_3\}$ having different sizes are present in the first ZCZ unlike in other ZCZs, and this has been generated due to the influence of delay spread. However, the receiver may identify a sequence transmitted by a transmitter by setting the size W of a ZCZ greater than the channel valid delay period L.

Meanwhile, more signatures may be defined as the interval of cyclic shiftings between sequences is reduced. For example, in FIG. 9, if the interval between cyclic shiftings is set to 1, a total of 16 signatures may be defined.

A multi quality of service (QoS) sequence is described below. The multi-QoS sequence may be generated based on an asymmetric CAZAC sequence set. The asymmetric CAZAC sequence set means a CAZAC sequence set having different intervals of cyclic shiftings between sequences in a time domain. In contrast, the CAZAC sequence set described in FIG. 8 and FIG. 9 may be called a symmetric CAZAC sequence set because the interval of cyclic shiftings between sequences is the same, that is, 1 and 4. In an asymmetric CAZAC sequence set, bits may be mapped to each sequence so that sequences having a small difference between cyclic shiftings share a specific bit. Furthermore, information having higher importance may be mapped to a shared bit.

Figure 11:
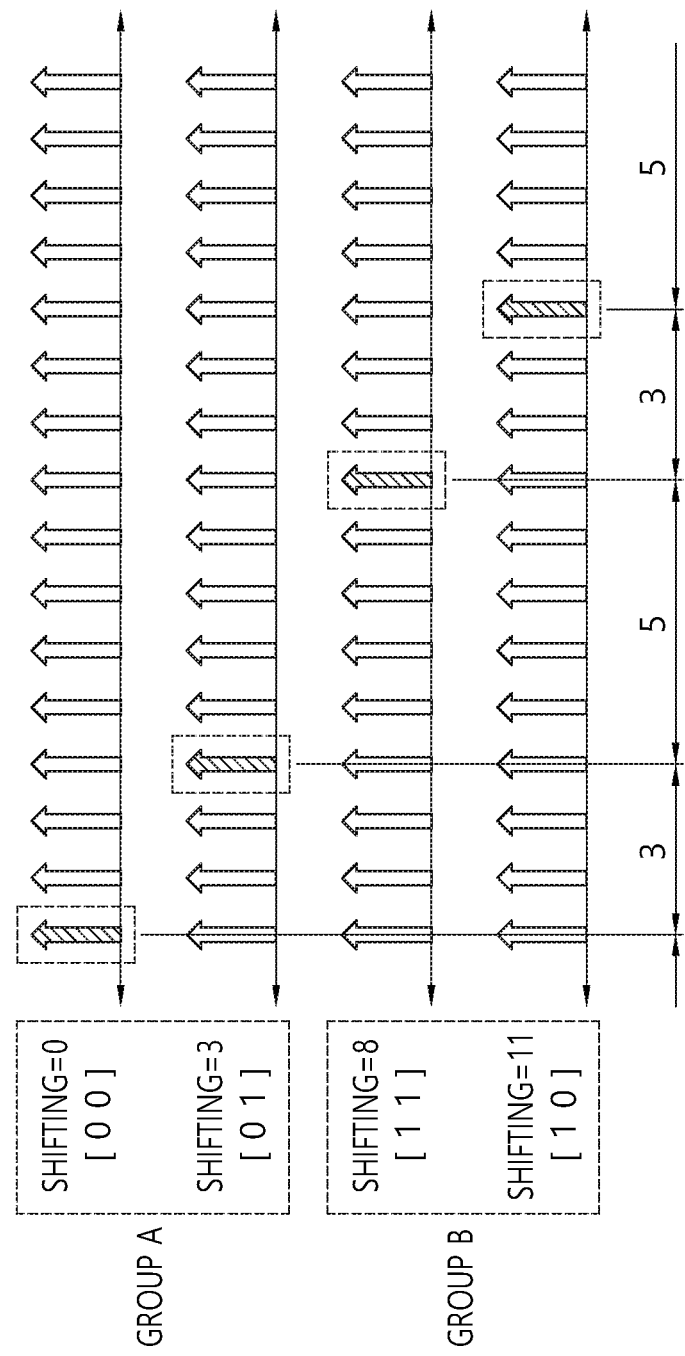
FIG. 11 shows an example of an asymmetric CAZAC sequence set.

FIG. 11 shows an example of an asymmetric CAZAC sequence set. Referring to FIG. 11, each sequence within a CAZAC sequence set has a different cyclic shifting (0, 3, 8, or 11), and the interval of cyclic shiftings between sequences is not the same (3 and 5). In this case, sequences having a small difference between cyclic shiftings may be grouped into a single group. That is, in FIG. 11, sequences having cyclic shiftings of 0 and 3 are grouped into a group A, and sequences having cyclic shiftings of 8 and 11 are grouped into a group B. Furthermore, in each group, bits may be mapped to each sequence so that the first bits are the same and the second bits are different. In FIG. 11, [0] is mapped to the sequences of the group A as the first bit, and [1] is mapped to the sequences of the group B as the first bit. As a result, in FIG. 11, [0 0] is mapped to a sequence having a cyclic shifting of 0, [0 1] is mapped to a sequence having a cyclic shifting of 3, [1 1] is mapped to a sequence having a cyclic shifting of 8, and [1 0] is mapped to a sequence having a cyclic shifting of 11, respectively.

If an asymmetric CAZAC sequence set is configured as described above, the interval of cyclic shifts between sequences within each group is 3, whereas the interval of cyclic shifts between groups is 5. In this case, a probability that a sequence having a cyclic shifting of 3 may be mistaken for a sequence having a cyclic shifting of 0 is higher than a probability that it may be mistaken for a sequence having a cyclic shifting of 8. That is, a probability that an error may occur in the first bit shared within a group is smaller than a probability that an error may occur in the second bit not shared within a group. Accordingly, information having higher importance may be mapped to the first bit, and information having relatively lower importance may be mapped to the second bit.

As a result, the asymmetric CAZAC sequence set is generated by making different the interval of cyclic shifts between sequences. Accordingly, a mistaken probability within a group may be different from a mistaken probability between groups. Information having different importance, that is, different QoS, is mapped based on a mistaken probability within a group and between groups, and thus a multi-QoS sequence may be finally transmitted.

The following information is an example of information having high importance.

A packet ID: a UE reads a packet ID and determines whether a currently received packet is its own packet. If the received packet is not its own packet, the UE no longer decode the packet and may reduce power by discarding the received packet. That is, if a packet ID is erroneously determined, a system yield may be greatly reduced because the packet itself is lost. Accordingly, a packet ID may be taken as information having high importance.

A basic service set ID (BSSID) of a Wi-Fi system: In the next-generation Wi-Fi system, a dense environment including many BSSs may be supported. In this case, when a UE reads a BSSID and recognizes that the transmission of a packet is generated within its own BSS, the UE may delay the transmission of its own packet although a channel is determined to be idle. The reason for this is that if its own packet is transmitted, decoding may be difficult due to a collision problem because an AP, that is, a recipient, has to receive a plurality of packets. Accordingly, a BSSID may be taken into consideration as information having high importance.

Bandwidth information: For example, if information of 2 bits is mapped to each sequence within a CAZAC sequence set as in the aforementioned embodiment, bandwidth information of 20 MHz, 40 MHz, 80 MHz, or 160 MHz may be mapped.

For example, information having low importance may include the number of Tx antennas or the location of an enhanced PDCCH (ePDCCH). In general, this information may be detected using a blind decoding method. However, blind decoding needs to be performed several times, and this may increase the latency and complexity of a system. If this information is transmitted through a signaling method, the disadvantages may be reduced or obviated. Furthermore, if information transmitted through a signaling method is not matched, it may be detected again using an existing blind decoding method. That is, since an error can be restored, an influence attributable to a failure in the transfer of the information is relatively small. As a result, information that may be restored may be classified as information having low importance.

Figure 12:
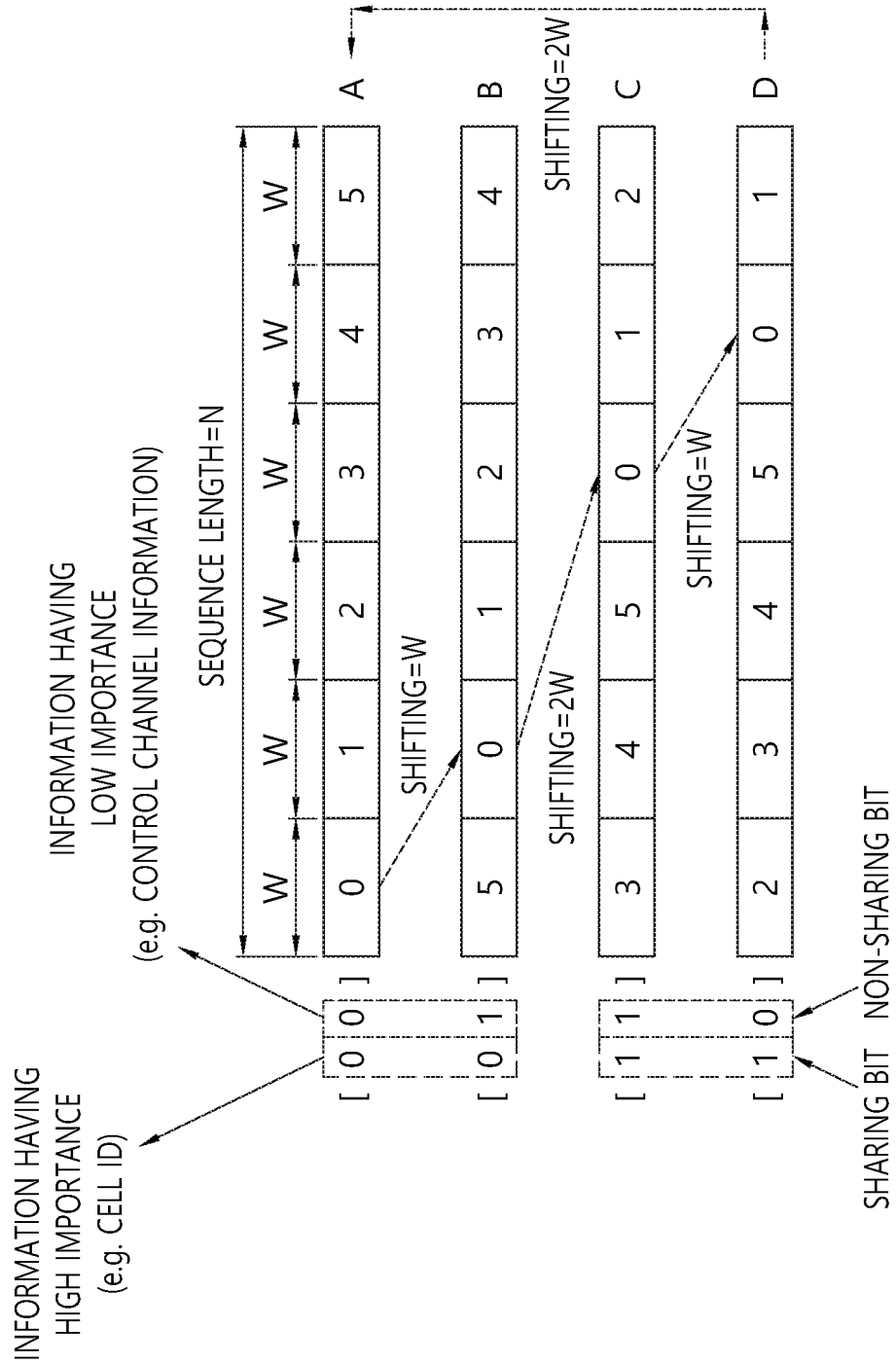
FIG. 12 shows another example of an asymmetric CAZAC sequence set.

FIG. 12 shows another example of an asymmetric CAZAC sequence set. Referring to FIG. 12, four sequences A, B, C, and D each having a length of N=6 W form an asymmetric CAZAC sequence set. The sequences A/B form a single group, and the sequences C/D form another group. The interval of cyclic shifts within each group is W, and the interval of cyclic shifts between the group is 2 W. In this case, it may be seen that a probability that a sequence may be mistaken for one of two neighbor sequences is different. For example, a probability that a sequence B may be mistaken for a sequence A is greater than a probability that the sequence B may be mistaken for a sequence C. Accordingly, bits may be mapped to each sequence so that sequences within a group having a small interval between cyclic shifts share a specific bit. In FIG. 12, the first bit mapped to a sequence becomes a shared bit within each group, and the second bit becomes a bit not shared within each group. [0] is mapped to the sequences A/B as the first bit, and [1] is mapped to the sequences C/D as the first bit. Furthermore, information having high importance may be mapped to a bit shared within a group, and information having low importance may be mapped to a bit not shared within a group. For example, a cell ID having high importance may be mapped to a bit shared within a group, and control channel information having low importance may be mapped to a bit not shared within a group.

An RACH preamble sequence may be designed as below by using the multi-QoS sequence. First, the RACH preamble sequence may be generated such that the cyclic shift $N_{CS}$ between the sequences in the same sequence group are the same and the cyclic shift offset between different sequence groups are different from each other by a predetermined value. More specifically, a first sequence group may be generated such that the cyclic shift between the sequences becomes the $N_{CS}$. In this case, the ZC sequence used for generating the RACH preamble sequence in the related art may be applied as it is. In addition, a cyclic shift offset $N_{off,g}$ between the sequence groups may be set. g as a group index has a value and $N_G$ represents the number of all sequence groups.

Figure 13:
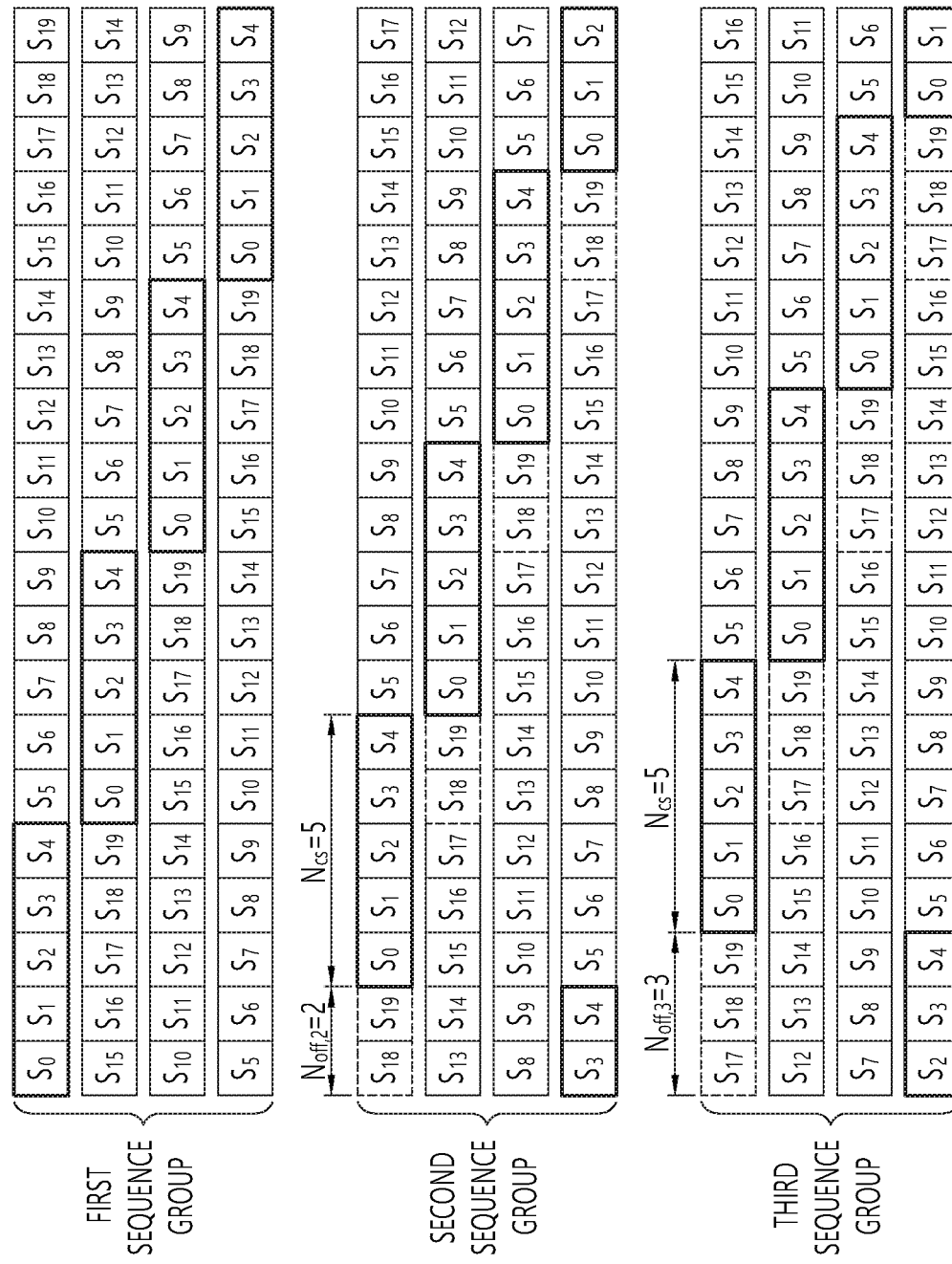
FIG. 13 shows one example of an RACH preamble sequence using a characteristic of a multi-OoS sequence.

FIG. 13 shows one example of an RACH preamble sequence using a characteristic of a multi-OoS sequence. In FIG. 13, it is assumed that the length of the sequence, Nzc is 20 and the number of sequence groups is 3. First, the first sequence group may be generated such that the cyclic shift between the sequences becomes the $N_{CS}$. In this case, the first sequence group may be generated to have the same characteristic as the RACH preamble sequence in the related art. In FIG. 13, it is assumed that $N_{CS}$=5. In addition, a second sequence group is the same as the first sequence group in that the cyclic shift between the sequences in the group, $N_{CS}$=5, but, the cyclic shift offset $N_{off,2}$ may be set such that the sequence is additionally cyclically shifted as a whole. In FIG. 13, it is assumed that $N_{off,2}$=2. Similarly, a third sequence group is the same as the first sequence group in that the cyclic shift between the sequences in the group, $N_{CS}$=5, but, the cyclic shift offset $N_{off,3}$ may be set such that the sequence is additionally cyclically shifted as a whole. In FIG. 13, it is assumed that $N_{off,3}$=3.

The cyclic shift offset between the sequence group, $N_{off,g}$ may be adaptively set or changed. Further, basically, it may be assumed that the cyclic shift offset of the first sequence group, $N_{off,1}$=0. Meanwhile, a zero-correlation zone means a region where a receiver output is observed in consideration of a channel delay of the RACH preamble transmitted by the UE. Therefore, it is possible to prevent ambiguity of sequence detection only when a relationship of $\max(N_{off,g})+W_D<N_{is}$ between the cyclic shift offset between the sequence groups and a channel delay window $W_D$. It is assumed that there is no round trip delay.

Figure 14:
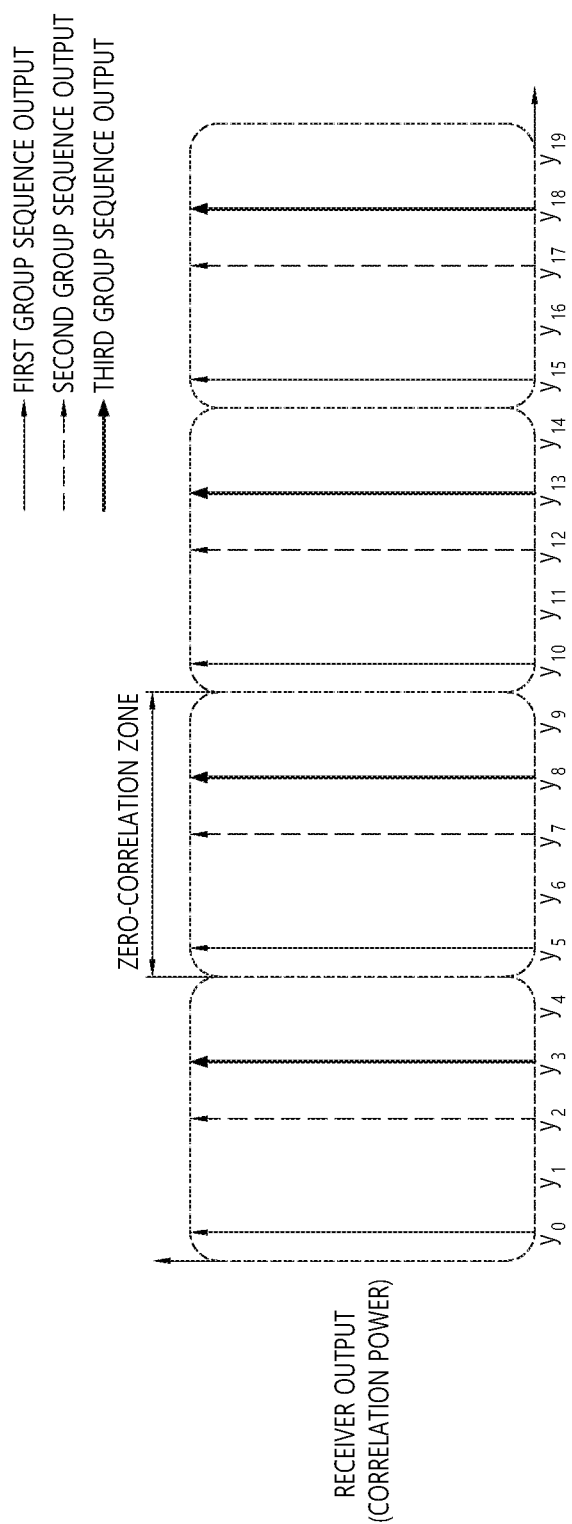
FIG. 14 shows detection of the RACH preamble sequence using the characteristic of the multi-OoS sequence.

FIG. 14 shows detection of the RACH preamble sequence using the characteristic of the multi-OoS sequence. When the UE transmits all sequences of the first, second, and third sequence groups described in FIG. 13 and an ideal communication environment without the channel delay is assumed, the eNB may obtain correlation based peak power illustrated in FIG. 14.

The characteristic of the multi-QoS sequence is applied to the RACH preamble sequence of 3GPP LTE/LTE-A as described below. In the LTE/LTE-A in the related art, the ZC sequence of a root index u may be defined by Equation 1.

$$x_u(n) = e^{-j\frac{\pi u n(n+1)}{N_{ZC}}}, 0 \le n \le N_{ZC} - 1 \qquad \text{<Equation 1>}$$

In Equation 1, $N_{ZC}$ represents the length of the ZC sequence. In this case, the RACH preamble sequence having the zero-correlation zone $N_{CS}$ may be expressed by Equation 2.

$$x_{u,v}(n) = x_u((n+C_v) \bmod N_{ZC}) \qquad \text{[93]<Equation 2>}$$

In Equation 2, a cyclic shift $C_v$ may be given as Equation 3.

<Equation 3>

$$C_v = \begin{cases} vN_{CS} & v=0, 1, \ldots, \lfloor N_{ZS}/N_{CS} \rfloor - 1, N_{CS} \ne 0 & \text{for unrestricted sets} \\ 0 & N_{CS} = 0 & \text{for unrestricted sets} \\ d_{start}\lfloor v/n_{shift}^{RA}\rfloor + \\ (v \bmod n_{shift}^{RA})N_{CS} & v=0, 1, \ldots, n_{shift}^{RA}\overline{n}_{group}^{RA} + \overline{n}_{shift}^{RA} - 1 & \text{for restricted sets} \end{cases}$$

The characteristic of the multi-QoS sequence is applied to the cyclic shift $C_v$ of the RACH preamble sequence of Equation 3 as described below. When unrestricted sets are described as an example in Equation 3, the cyclic shift of the first sequence group is the same as $vN_{CS}$ as shown in Equation 3, but the cyclic shift of the second sequence group may defined by Equation 4 and the cyclic shift of the third sequence group may be defined by Equation 5.

$$C_v = vN_{CS} + N_{off,2} \qquad \text{[99]<Equation 4>}$$

$$v=0, 1, \ldots, \lfloor N_{ZC}/N_{CS} \rfloor - 1$$

$$C_v = vN_{CS} + N_{off,3} \qquad \text{<Equation 5>}$$

$$v=0, 1, \ldots, \lfloor N_{ZC}/N_{CS} \rfloor - 1$$

Referring to Equation 4, it can be seen that $N_{off,2}$ which is the cyclic shift offset of the second sequence group is added to the cyclic shift of the second sequence group. Further, referring to Equation 5, it can be seen that $N_{off,3}$ which is the cyclic shift offset of the third sequence group is added to the cyclic shift of the third sequence group.

A method for transmitting the RACH preamble generated based on a sequence (hereinafter, a combination sequence) configured by the multi-QoS sequence or a specific combination of sequences which belong to different sequence groups is described below. First, the sequence of each sequence group may be expressed by Equation 6. In Equation 1, $s_i(j)$ represents an i-th sequence (i=0, 1, 2, . . . ) of a j-th group (j=1, 2, 3, . . . ).

$$s_0^{(1)} = [s_0, s_1, \ldots, s_{N_{ZC}-1}]^T \qquad \text{<Equation 6>}$$

$$s_1^{(1)} = \begin{bmatrix} s_{N_{ZC}-N_{CS}}, s_{N_{ZC}-N_{CS}+1}, \ldots, \\ s_{N_{ZC}-N_{CS}-1} \end{bmatrix}^T$$

$$s_2^{(1)} = \begin{bmatrix} s_{N_{ZC}-2 \cdot N_{CS}}, s_{N_{ZC}-2 \cdot N_{CS}+1}, \ldots, \\ s_{N_{ZC}-2 \cdot N_{CS}-1} \end{bmatrix}^T$$

$$\vdots$$

$$s_0^{(2)} = \begin{bmatrix} s_{N_{off,2}}, s_{N_{off,2}+1}, \ldots, \\ s_{N_{off,2}+N_{ZC}-1} \end{bmatrix}^T$$

$$s_1^{(2)} = \begin{bmatrix} s_{N_{off,2}+N_{ZC}-N_{CS}}, \\ s_{N_{off,2}+N_{ZC}-N_{CS}+1}, \ldots, \\ s_{N_{off,2}+N_{ZC}-N_{CS}-1} \end{bmatrix}^T$$

$$s_2^{(2)} = \begin{bmatrix} s_{N_{off,2}+N_{ZC}-2 \cdot N_{CS}}, \\ s_{N_{off,2}+N_{ZC}-2 \cdot N_{CS}+1}, \ldots, \\ s_{N_{off,2}+N_{ZC}-2 \cdot N_{CS}-1} \end{bmatrix}^T$$

$$\vdots$$

$$s_0^{(3)} = \begin{bmatrix} s_{N_{off,3}}, s_{N_{off,3}+1}, \ldots, \\ s_{N_{off,3}+N_{ZC}-1} \end{bmatrix}^T$$

$$s_1^{(3)} = \begin{bmatrix} s_{N_{off,3}+N_{ZC}-N_{CS}}, \\ s_{N_{off,3}+N_{ZC}-N_{CS}+1}, \ldots, \\ s_{N_{off,3}+N_{ZC}-N_{CS}-1} \end{bmatrix}^T$$

$$s_2^{(3)} = \begin{bmatrix} s_{N_{off,3}+N_{ZC}-2 \cdot N_{CS}}, \\ s_{N_{off,3}+N_{ZC}-2 \cdot N_{CS}+1}, \ldots, \\ s_{N_{off,3}+N_{ZC}-2 \cdot N_{CS}-1} \end{bmatrix}^T$$

$$\vdots$$

$$s_0^{(N_G)} = \begin{bmatrix} s_{N_{off,N_G}}, s_{N_{off,N_G}+1}, \ldots, \\ s_{N_{off,N_G}+N_{ZC}-1} \end{bmatrix}^T$$

$$s_1^{(N_G)} = \begin{bmatrix} s_{N_{off,N_G}+N_{ZC}-N_{CS}}, \\ s_{N_{off,N_G}+N_{ZC}-N_{CS}+1}, \ldots, \\ s_{N_{off,N_G}+N_{ZC}-N_{CS}-1} \end{bmatrix}^T$$

$$s_2^{(N_G)} = \begin{bmatrix} s_{N_{off,N_G}+N_{ZC}-2 \cdot N_{CS}}, \\ s_{N_{off,N_G}+N_{ZC}-2 \cdot N_{CS}+1}, \ldots, \\ s_{N_{off,N_G}+N_{ZC}-2 \cdot N_{CS}-1} \end{bmatrix}^T$$

$$\vdots$$

The multi-QoS sequence may be generated by Equation 7 based on the sequence of each sequence group expressed in Equation 6.

$$s = \alpha_1 s_i^{(1)} + \alpha_2 s_i^{(2)} + \alpha_3 s_i^{(3)} + \ldots + \alpha_{N_G} s_i^{(N_G)} \qquad \text{<Equation 7>}$$

Referring to Equation 7, the multi-QoS sequence is calculated by granting a weight $\alpha_j$ to the same i-th sequence of the respective sequence groups and adding up the sequences granted with the weight $\alpha_j$. For example, when it is assumed that the first sequence of the first group is $s_0^{(1)} = [s_0, s_1,$ $s_2, s_3, \ldots, s_{19}]^T$ and the first sequence of the second sequence group is $s_0^{(2)} = [s_{18}, s_{19}, s_0, s_1, \ldots, s_{17}]^T$, and the weight of each sequence, $\alpha 1 = \alpha 2 = 1$, the multi-QoS sequence which the UE finally transmits the UE may be generated as shown in Equation 8.

$$s = s_0^{(1)} + s_0^{(2)} = \qquad \text{<Equation 8>}$$
$$[s_0 + s_{18}, s_1 + s_{19}, s_2 + s_0, s_3 + s_1, \ldots, s_{19} + s_{17}]^T$$

The following procedure may just follow an RACH preamble transmission procedure in the related art.

In the random access procedure of the collision of the RACH preamble is described.

Figure 15:
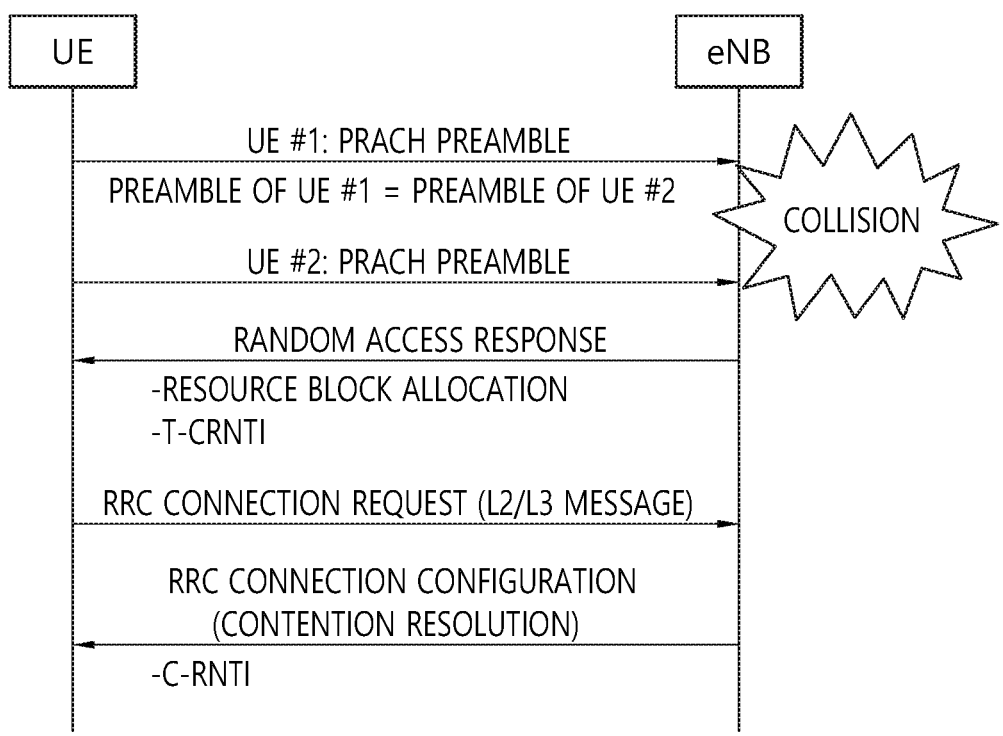
FIG. 15 shows one example in which the RACH preambles collide in a contention based random access procedure.

FIG. 15 shows one example in which the RACH preambles collide in a contention based random access procedure. All UEs may use the contention based random access procedure described in FIG. 6 in order to obtain UL synchronization and transmit the RACH preamble by using a specific time-frequency resource. In this case, when two or more RACH preambles are transmitted from a plurality of UEs through the same time-frequency resource, the collision occurs in the case where the eNB detects the RACH preamble, the random access procedure of each UE may be restarted. That is, when the RACH preamble of UE #0 and the RACH preamble of UE #1 are transmitted through the same time-frequency resource, the RACH preambles collide with each other.

When the eNB may not recognize the collision at the time of detecting the RACH preamble, an actual collision occurs, the eNB may not know the actual collision. In this case, all UEs in which the RACH preambles collide with each other may receive the random access response and all of the UEs in which the collision occurs may transmit the RRC connection request message to the eNB. The eNB that receives the RRC connection request message from the UE in which the collision occurs may recognize the collision of the RACH preamble and restart the random access procedure. When the eNB may recognize the collision at the time of detecting the RACH preamble, the corresponding UE may not receive the random access response to the RACH preamble.

Meanwhile, the eNB that receives the RACH preamble may transmit the random access response after 3 ms. However, a size of ra-ResponseWindowSize of RACH-Config-Common information element (IE) is set to 2 to 10 ms. Therefore, a difference of a maximum of 12 ms may occurs between reception of the RACH preamble and transmission of the random access response. Consequently, the UE may recognize whether the RACH preambles collide with each other after a maximum of 12 ms and retransmits the RACH preamble after waiting for receiving the random access response for a maximum of 12 ms. When UE #0 and UE #1 that retransmit the RACH preamble due to the collision of the RACH preambles use the same RACH preamble again, the collision may occur again.

Figure 16:
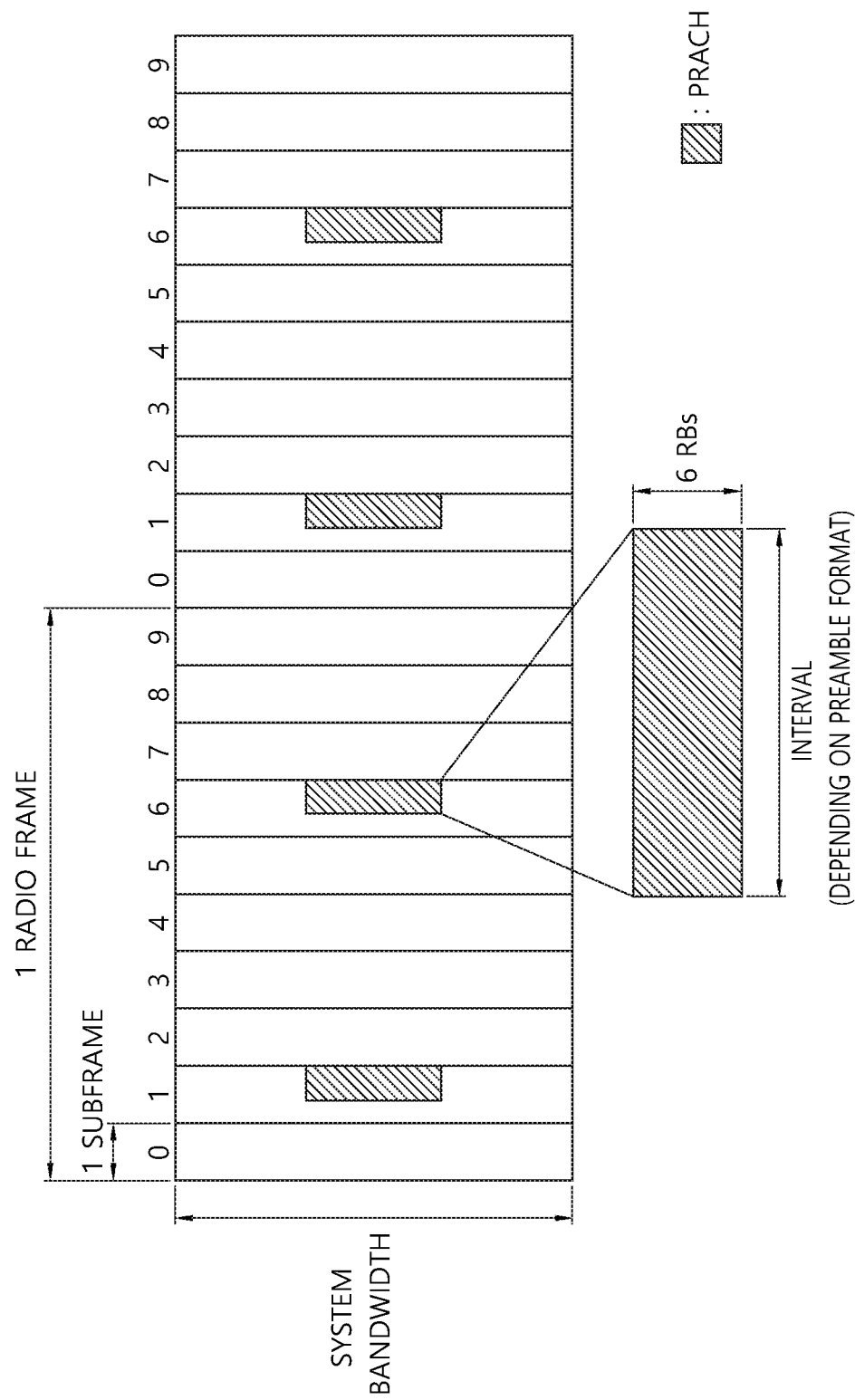
FIG. 16 shows a time-frequency resource in which the RACH preamble is transmitted.

FIG. 16 shows a time-frequency resource in which the RACH preamble is transmitted. In FIG. 16, it is assumed that a PRACH resource depending on PRACH configuration index 6 is configured in frame structure type 1, that is, an FDD frame. A region checked in FIG. 16 is a PRACH resource region, that is, a region where the UE maps and transmits the sequence for the RACH preamble. When UE #0 and UE #1 select the same preamble sequence and transmit the RACH preamble by selecting the same PRACH resource region, the RACH preambles collide with each other.

Figure 17:
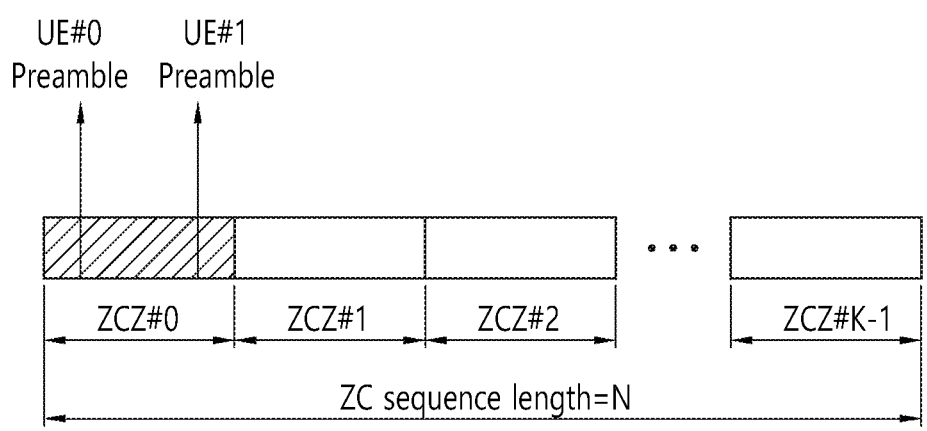
FIG. 17 shows an example of a RACH preamble collision.

FIG. 17 shows an example of a RACH preamble collision. Generally, when designing the RACH preamble using the ZC sequence, the UE divides the ZC sequence into multiple ZCZs and transmits the ZC sequence in a cyclic-shifted manner, and the eNB detects the ZC sequence in a corresponding ZCZ such that the base station obtains the RACH preamble ID transmitted by the UE. Thus, if two or more distinct correlation peaks are detected in a specific ZCZ, it may be considered that the RACH preamble collision occurs. Referring to FIG. 17, two correlation peaks are detected in one ZCZ. Therefore, the eNB recognizes the RACH preamble collision, assuming that two or more UEs have selected the same RACH preamble.

In the case of performing the random access procedure using the existing single ZCZ-based RACH preamble, it is difficult to increase the detection probability of the RACH preamble for the specific UE, and, thus, all the UEs use the RACH preambles with the same collision probability, in the contention-based random access procedure. Therefore, it is difficult to support the preferential UL synchronization acquisition for the UE that urgently needs to acquire the UL synchronization due to the handover or the like. On the other hand, in the non-contention-based random access procedure, it is possible to preliminarily allocate a specific RACH preamble to a UE that desires to acquire UL synchronization urgently, thereby to support preferential UL synchronization acquisition for the UE, but it is impossible to allocate limited RACH preambles to all UEs in the cell.

In order to solve the above problem, the present invention proposes a RACH preamble design method and a RACH preamble detection procedure to increase a detection probability of a RACH preamble by a specific UE that desires to preferentially obtain UL synchronization. According to an embodiment of the present invention, a RACH preamble may be generated using a combination of a plurality of sequences corresponding to a plurality of ZCZs. The present invention proposes a method of improving RACH preamble detection by focusing on improvement of a contention-based random access procedure.

According to an embodiment of the present invention, a UE desiring to acquire UL synchronization preferentially selects a plurality of ZCZs in a specific combination, generates a RACH preamble using a combination of a plurality of sequences corresponding to each ZCZ, and transmits the RACH preamble to the eNB. That is, the UE may transmit the RACH preamble including a combination of a plurality of sequences corresponding to a plurality of ZCZs so that the RACH preamble with multiple peaks in the plurality of ZCZs is received by the eNB.

Figure 18:
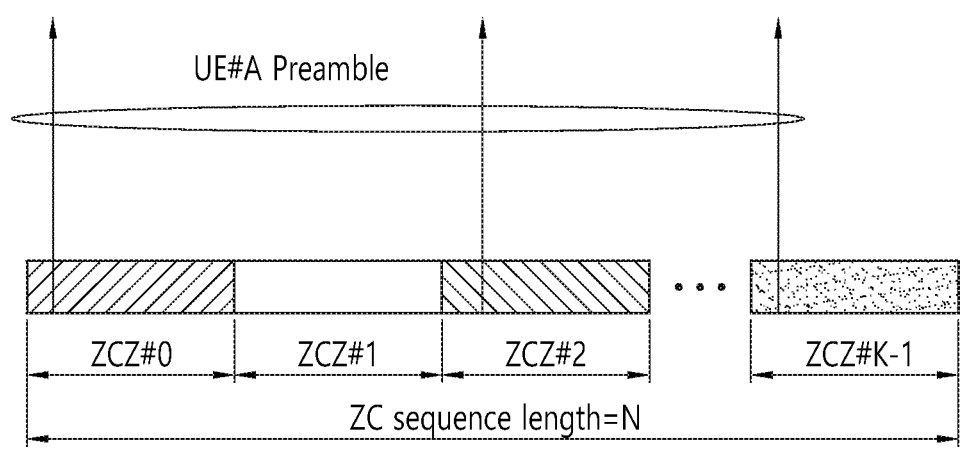
FIG. 18 shows an example of a RACH preamble generated using a combination of a plurality of sequences corresponding to a plurality of ZCZs according to an embodiment of the present invention.

FIG. 18 shows an example of a RACH preamble generated using a combination of a plurality of sequences corresponding to a plurality of ZCZs according to an embodiment of the present invention. Referring to FIG. 18, the RACH preamble of UE #A may be composed of a combination of three sequences. A first sequence of the three sequences constituting the RACH preamble is detected in ZCZ #0, the second sequence in ZCZ #2, and the third sequence in ZCZ #K−1.

A plurality of sequences corresponding to a plurality of ZCZs respectively may be generated as follows. For example, three sequences corresponding to three ZCZs respectively based on the embodiment of FIG. 18 may be represented by Equations 9 to 11, respectively. Equation 9 is an equation for generating the first sequence corresponding to the first ZCZ, Equation 10 is an equation for generating the second sequence corresponding to the second ZCZ, and Equation 11 is an equation for generating the third sequence corresponding to the third ZCZ. Equations 9 to 11 correspond to an unrestricted sequence set, and the number of sequences in each sequence group is the same. A plurality of sequences may be selected from the same sequence group.

$$x_{u,v}(n) = x_u((n+C_{v_1}) \bmod N_{ZC}) \qquad \text{<Equation 9>}$$

$$C_{v_1} = v_1 N_{CS}$$

$$v_1 = 0, 1, \ldots, \lfloor N_{ZC}/N_{CS} \rfloor - 1$$

$$x_{u,v}(n) = x_u((n+C_{v_2}) \bmod N_{ZC}) \qquad \text{<Equation 10>}$$

$$C_{v_2} = v_2 N_{CS}$$

$$v_2 = 0, 1, \ldots, \lfloor N_{ZC}/N_{CS} \rfloor - 1$$

$$x_{u,v}(n) = x_u((n+C_{v_3}) \bmod N_{ZC}) \qquad \text{<Equation 11>}$$

$$C_{v_3} = v_3 N_{CS}$$

$$v_3 = 0, 1, \ldots, \lfloor N_{ZC}/N_{CS} \rfloor - 1$$

Each of Equations 9 to 11 has basically the same form as equation 2 described above. However, for equations 9 to 11, the cyclic shifts $C_{v_1}$, $C_{v_2}$, and $C_{v_3}$ are different from each other, and v1≠v2≠v3. Thus, a plurality of sequences corresponding to a plurality of ZCZs respectively may be generated.

A RACH preamble using a combination of a plurality of sequences corresponding to multiple ZCZs respectively may be generated according to Equation 12.

$$s = \alpha_1 s_{v_1}^{(j)} + \alpha_2 s_{v_2}^{(j)} + \alpha_3 s_{v_3}^{(j)} + \ldots \qquad \text{<Equation 12>}$$

In the Equation 12, $s_{i1}^{(j)}$ refers to a $v_i$-th sequence ($v_i$=0, 1, 2, ...) of a j-th sequence group (j=1, 2, 3, ...). $N_{ZC}$=839, a cyclic shift length $N_{CS}$=119. Assuming that UE #A adds second, third, and sixth sequences of the first sequence group to generate the RACH preamble, the RACH preamble may be expressed by Equation 13.

$$s_A = \alpha_2 s_2^{(1)} + \alpha_3 s_3^{(1)} + \alpha_6 s_6^{(1)} \qquad \text{<Equation 13>}$$

$$\alpha_2 = \alpha_3 = \alpha_6 = \sqrt{1/3 P}, (\alpha_2^2 + \alpha_3^2 + \alpha_6^2 = P)$$

A final received signal at the eNB may be expressed as Equation 14.

$$y_i = |r^H s^{(i)}| \qquad \text{<Equation 14>}$$

In the Equation 14, $y_i$ is a final receive power, r is a receive vector in a time domain, and s(i) is a i-th cyclic-shifted sequence vector.

Figure 19:
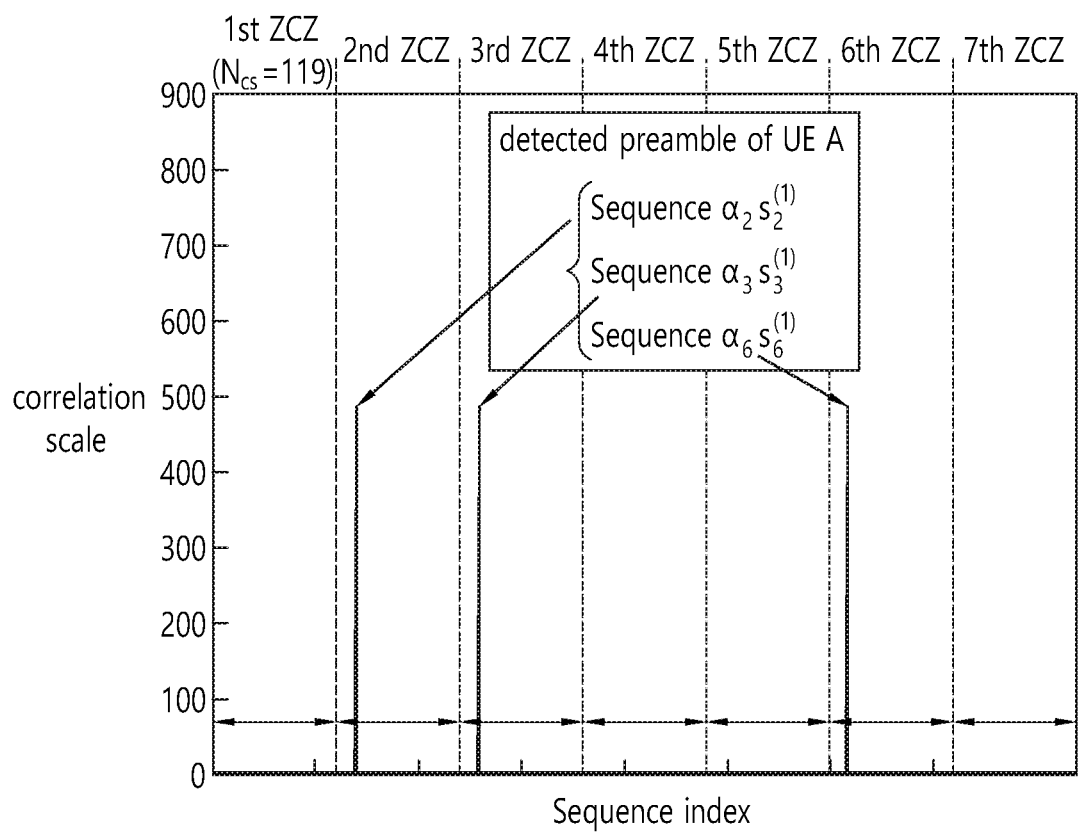
FIG. 19 shows an example of detection of a RACH preamble generated using a plurality of sequences respectively corresponding to a plurality of ZCZs according to an embodiment of the present invention.

FIG. 19 shows an example of detection of a RACH preamble generated using a plurality of sequences respectively corresponding to a plurality of ZCZs according to an embodiment of the present invention. Referring to FIG. 19, the RACH preamble is detected in the form of multiple peaks in the plurality of ZCZs.

In addition, according to an embodiment of the present invention, when a UE desiring to acquire UL synchronization preferentially generates a RACH preamble using a combination of a plurality of sequences corresponding to a plurality of ZCZs, this may be performed based on pre-defined signaling from the eNB. That is, instead of performing a combination of a plurality of sequences corresponding to a plurality of ZCZs arbitrarily, the UE desiring to acquire UL synchronization preferentially performs a combination of the plurality of ZCZs corresponding to a plurality of ZCZs according to a scheme previously defined by the eNB. This is to increase the detection probability of the RACH preamble when the UE transmits the RACH preamble using the combination of the plurality of sequences corresponding to the plurality of ZCZs. When the total number of RACH preamble IDs is $N_{PID}$, and when the sequence constituting the RACH preamble in a specific ZCZ has collision or is not detected, except for all UEs using all $N_{PID}$ RACH preamble IDs, it is possible to increase the detection probability of RACH preamble of the specific UE by a pattern comparison via detection in other ZCZ. Further, when a transmission power of the UE is limited to $P_{max}$, and when the plurality of sequences are combined, a receive signal power per sequence decreases, but multiple peaks of a corresponding sequence are detected in several ZCZs.

For example, the eNB may signal to the UE the number Nx of all sequences used to generate the RACH preamble. That is, the UE desiring to preferentially acquire UL synchronization may receive the number Nx of all sequences used to generate the RACH preamble. The UE may generate the RACH preamble by performing a combination of the Nx sequences. At this time, the Nx sequences may be determined by various methods described below.

1) The eNB may arbitrarily select Nx sequences and transmit information about the selection to the UE. At this time, a pattern of a sequence combination to be used by the UE to generate the RACH preamble may be predefined for each Nx. Table 1 shows an example of a pattern of a sequence combination predefined for each Nx.

TABLE 1

| All sequences Nx | Sequence group | Selected sequence |
|---|---|---|
| 1 | First group | $[s_1^{(1)}]$ |
| 2 | First group | $[s_2^{(1)}, s_3^{(1)}]$ |
| 3 | First group | $[s_1^{(1)}, s_2^{(1)}, s_5^{(1)}]$ |
| ... | ... | ... |

Referring to Table 1, a combination of sequences to be used by the UE to generate the RACH preamble when Nx=1 is predefined as $[s_1^{(1)}]$. A combination of sequences to be used by the UE to generate the RACH preamble when the total number of sequences Nx=2 is predefined as $[s_2^{(1)}, s_3^{(1)}]$. A combination of sequences to be used by the UE to generate the RACH preamble when Nx=3 is predefined as $[s_1^{(1)}, s_2^{(1)}, s_5^{(1)}]$. Thus, the pattern of the sequence combination may be predefined for each Nx.

2) The eNB may select Nx sequences for each UE based on C-RNTI of each UE, and may transmit information about the selection to the UE. For example, Nx=C-RNTI mod $N_{max}$. That is, the number Nx of all sequence for each UE is selected using C-RNTI of each UE and modulo operation. Thus, a pattern of the sequence combination may be determined. Table 2 shows an example of Nx sequences and a pattern of a sequence combination selected for each UE based on the C-RNTI of each UE.

TABLE 2

| UE (different C-RNTI) | All sequence Nx | Sequence group | Selected sequence |
|---|---|---|---|
| UE #A | 3 | First group | $[s_2^{(1)}, s_3^{(1)}, s_6^{(1)}]$ |
| UE #B | 2 | Second group | $[s_5^{(2)}, s_7^{(2)}]$ |
| UE #C | 4 | Fourth group | $[s_1^{(4)}, s_2^{(4)}, s_4^{(4)}, s_8^{(4)}]$ |
| ... | ... | ... | ... |

Referring to Table 2, the number Nx=3 of all sequences may be determined for UE #A based on the C-RNTI of UE #A, and a pattern of a sequence combination for UE #A may be determined accordingly. The number Nx=2 of all sequences may be determined for UE #B based on the C-RNTI of UE #B, and a pattern of a sequence combination for UE #B may be determined accordingly. The number Nx=4 of all sequences may be determined for UE #C based on the C-RNTI of UE #C, and a pattern of a sequence combination for UE #C may be determined accordingly. As described above, the number Nx of all sequences is determined for each of UEs having different C-RNTIs, and thus the pattern of the sequence combination may be determined based on the number Nx.

3) The eNB may select Nx sequences based on a RACH preamble for each UE, and may transmit information about the selection to the UE. For example, the number Nx of all sequence is selected based on a RACH preamble ID that the UE randomly selects among 64 RACH preambles for the 3GPP LTE, and, thus, a pattern of a sequence combination may be determined based on the selected Nx. Table 3 shows an example of Nx sequences and a pattern of a sequence combination selected based on a UE-specific RACH preamble.

TABLE 3

| RACH preamble ID | All sequence Nx | Sequence group | Selected sequence |
|---|---|---|---|
| 0 | 3 | First group | $[s_2^{(1)}, s_3^{(1)}, s_6^{(1)}]$ |
| 1 | 2 | Second group | $[s_5^{(2)}, s_7^{(2)}]$ |
| 2 | 4 | Fourth group | $[s_1^{(4)}, s_2^{(4)}, s_4^{(4)}, s_8^{(4)}]$ |
| ... | ... | ... | ... |
| 63 | 1 | Third group | $[s_5^{(3)}]$ |

Referring to Table 3, based on the RACH preamble ID=0, the number Nx=3 of all sequences may be determined, and, thus, a pattern of a sequence combination may be determined based on the determined Nx. Based on the RACH preamble ID=1, the number Nx=2 of all sequences may be determined, and, thus, a pattern of a sequence combination may be determined based on the determined Nx. Based on the RACH preamble ID=2, the number Nx=4 of all sequences may be determined, and, thus, a pattern of a sequence combination may be determined based on the determined Nx. Based on the RACH preamble ID=63, the number Nx=1 of all sequences may be determined, and, thus, a pattern of a sequence combination may be determined based on the determined Nx. As described above, the number Nx of all sequences is determined based on the RACH preamble ID that the UE randomly selects, and thus the pattern of the sequence combination is determined based on the determined Nx.

According to an embodiment of the present invention, when the UE transmits a RACH preamble generated using a combination of a plurality of sequences corresponding to a plurality of ZCZs, the eNB may detect the RACH preamble having multiple peaks. At this time, the eNB recognizes the corresponding RACH preamble as the RACH preamble for the non-contention-based random access procedure, and preferentially supports a random access procedure for the corresponding UE. For example, when multiple peaks of the RACH preamble generated using a combination of a plurality of sequences are detected, the eNB recognizes the RACH preamble as a RACH preamble for a non-contention-based random access procedure. When a RACH preamble generated using a single sequence is detected, the eNB recognizes the RACH preamble as a RACH preamble for a contention-based random access procedure.

Further, according to an embodiment of the present invention, the eNB adjusts a ratio between the number of RACH preambles generated using a combination of a plurality of sequences and the number of RACH preambles generated using a single sequence, based on the number of UEs in the cell. When the eNB detects the RACH preamble according to the present invention, the detection of the multiple peaks of the RACH preamble generated using the combination of a plurality of sequences and the detection of the RACH preamble generated using the single sequence eventually coexist. Therefore, a trade-off may occur such that a collision probability of the RACH preamble for the existing contention-based random access procedure increases, while a detection probability of the RACH preamble for the non-contention-based random access procedure increases. Thus, it may be required to appropriately adjust the ratio between the number of RACH preambles generated using a combination of a plurality of sequences and the number of RACH preambles generated using a single sequence.

Table 4 shows an example of adjusting, via eNB signaling, the number of RACH preambles generated using a combination of a plurality of sequences and the number of RACH preambles generated using a single sequence. The eNB sets the number of RACH preambles generated using a combination of a plurality of sequences and the number of RACH preambles generated using a single sequence with consideration of a distribution of UEs in the cell and a ratio of UEs urgently requesting acquisition of UL synchronization, and, then, the eNB signals these settings to the UE.

TABLE 4

| Preamble ID | Preamble type | Sequence group | Selected sequence |
|---|---|---|---|
| 0 | Single sequence type | First group | $[s_1^{(1)}]$ |
| 1 | Single sequence type | First group | $[s_2^{(1)}]$ |
| 2 | Single sequence type | First group | $[s_3^{(1)}]$ |
| 3 | Single sequence type | First group | $[s_4^{(1)}]$ |
| ... | ... | ... | ... |
| 60 | Sequences combination type | Second group | $[s_5^{(2)}, s_7^{(2)}]$ |
| 61 | Sequences combination type | Fourth group | $s_1^{(4)}, s_2^{(4)}, s_4^{(4)}]$ |
| 62 | Sequences combination type | First group | $[s_2^{(1)}, s_3^{(1)}, s_4^{(1)}]$ |
| 63 | Sequences combination type | Third group | $[s_6^{(3)}, s_6^{(3)}]$ |

Referring to Table 4, the number of RACH preambles generated using a single sequence is set to 60, and the number of RACH preambles generated using a combination of a plurality of sequences is set to 4. This is just an example. As described above, the ratio between the number of RACH preambles generated by using a single sequence and the number of RACH preambles generated using a combination of a plurality of sequences may be variously adjusted depending on the distribution of UEs in the cell and a ratio of the UEs urgently requesting acquisition of UL synchronization.

Figure 20:
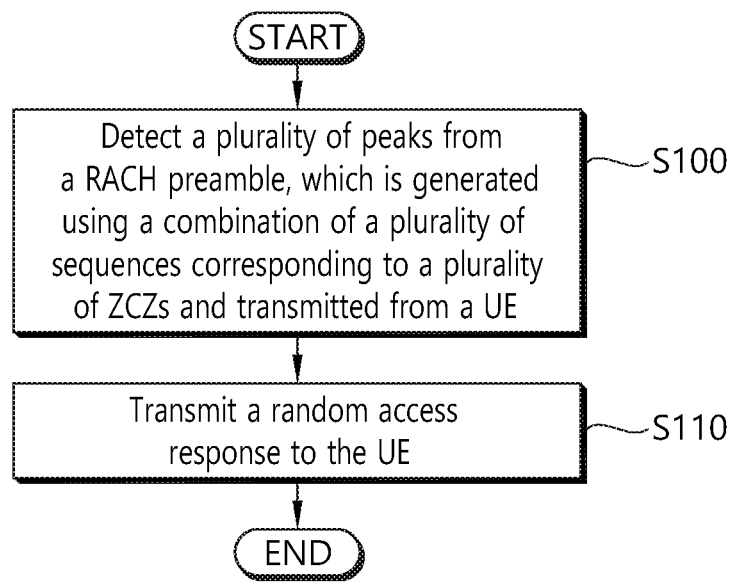
FIG. 20 shows a method of detecting a RACH preamble by an eNB according to an embodiment of the present invention.

FIG. 20 shows a method of detecting a RACH preamble by an eNB according to an embodiment of the present invention. In step S100, the eNB detects a plurality of peaks from the RACH preamble generated using a combination of a plurality of sequences corresponding to a plurality of ZCZs as transmitted from the UE. The UE may be a UE requesting urgent uplink synchronization acquisition. In step S110, the eNB sends a random access response to the UE.

The above-described contents of the present invention may be applied to the RACH preamble generated using a combination of a plurality of sequences corresponding to a plurality of ZCZs. That is, the plurality of sequences may belong to the same sequence group. Further, the cyclic shiftings applied to the plurality of sequences may be different. Further, the eNB may transmit information on the number of the plurality of sequences to the UE. The number of the plurality of sequences is randomly determined, and, thus, a pattern of a sequence combination corresponding to the number of the plurality of sequences may be predetermined. Alternatively, the number of the plurality of sequences may be determined based on a previously allocated C-RNTI of the UE. Alternatively, the number of the plurality of sequences may be determined based on the RACH preamble ID selected by the UE.

Figure 21:
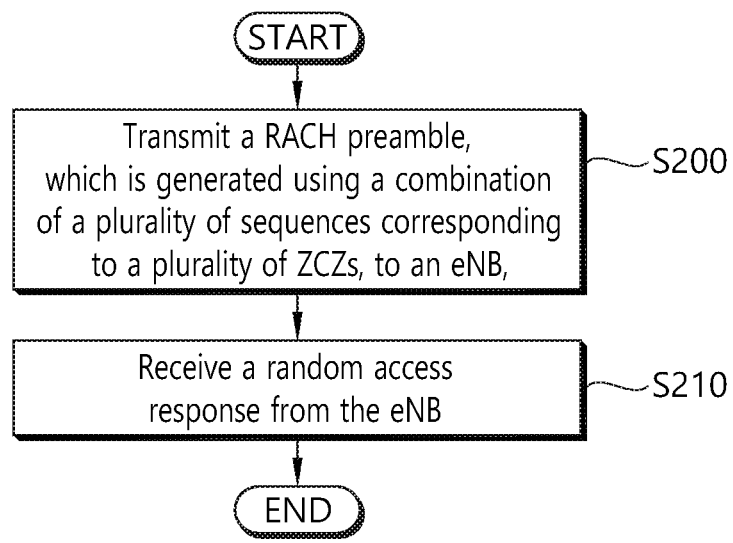
FIG. 21 shows a method of transmitting a RACH preamble by a UE according to an embodiment of the present invention.

FIG. 21 shows a method of transmitting a RACH preamble by a UE according to an embodiment of the present invention. The UE may be a UE requesting urgent uplink synchronization acquisition. In step S200, the UE transmits to the eNB a RACH preamble generated using a plurality of sequences corresponding to a plurality of ZCZs. In step S210, the UE receives a random access response from the eNB.

The above-described contents of the present invention may be applied to the RACH preamble generated using a combination of a plurality of sequences corresponding to a plurality of ZCZs. That is, the plurality of sequences may belong to the same sequence group. Further, the cyclic shiftings applied to the plurality of sequences may be different. Further, the RACH preamble may be generated using a number of the plurality of sequences. Further, the eNB may transmit information on the number of the plurality of sequences to the UE. The number of the plurality of sequences is arbitrarily determined, and, thus, a pattern of a sequence combination corresponding to the number of the plurality of sequences may be predetermined. Alternatively, the number of the plurality of sequences may be determined based on a previously allocated C-RNTI of the UE. Alternatively, the number of the plurality of sequences may be determined based on the RACH preamble ID selected by the UE.

Figure 22:
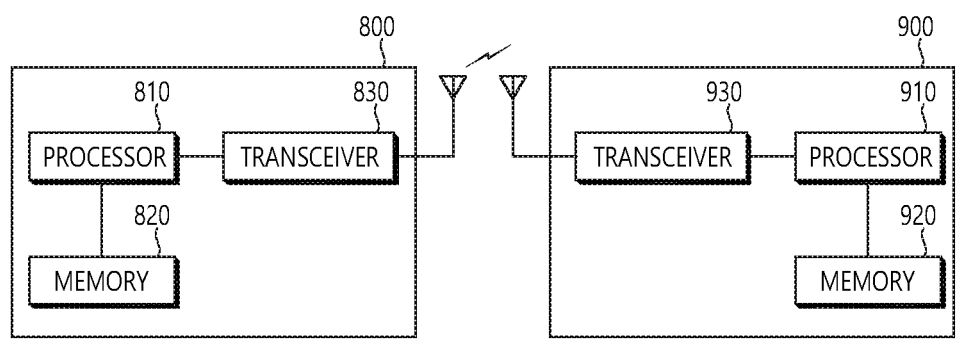
FIG. 22 shows a wireless communication system to implement an embodiment of the present invention.

FIG. 22 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for detecting a random access channel (RACH) preamble by an evolved NodeB (eNB) in a wireless communication system, the method comprising:
    transmitting, by the eNB, information on a plurality of sequences to a user equipment (UE),
    wherein a number of the plurality of sequences is randomly determined,
    detecting, by the eNB, a plurality of peaks from the RACH preamble,
    wherein the RACH preamble is generated, by the UE, using a combination of the plurality of sequences for a plurality of zero-correlation zones (ZCZ), and wherein the RACH preamble is transmitted from the UE to the eNB; and
    transmitting, by the eNB, a random access response to the UE,
    wherein a pattern of the combination of the plurality of sequences is predetermined.
2. The method of claim 1, wherein the plurality of sequences belong to a same sequence group.
3. The method of claim 1, wherein cyclic shiftings applied to the plurality of sequences are different from each other.
4. The method of claim 1, wherein the number of the plurality of sequences is determined based on a previously-allocated cell radio network temporary identity (C-RNTI) of the UE.
5. The method of claim 1, wherein the number of the plurality of sequences is determined based on a RACH preamble identifier (ID) selected by the UE.
6. The method of claim 1, wherein the UE requests urgent uplink synchronization acquisition.
7. A method for transmitting a random access channel (RACH) preamble by a user equipment (UE) in a wireless communication system, the method comprising:
    receiving, by the UE, information on a plurality of sequences from an evolved NodeB (eNB),
    wherein a number of the plurality of sequences is randomly determined,
    transmitting, by the UE, the RACH preamble to the eNB, wherein the RACH preamble is generated, by the UE, using a combination of the plurality of sequences corresponding to a plurality of zero-correlation zones (ZCZ); and
    receiving, by the UE, a random access response from the eNB,
    wherein a pattern of the combination of the plurality of sequences is predetermined.
8. The method of claim 7, wherein the plurality of sequences belong to a same sequence group.
9. The method of claim 7, wherein cyclic shiftings applied to the plurality of sequences are different from each other.
10. The method of claim 7, wherein the RACH preamble is generated using a number of the plurality of sequences.
11. The method of claim 7, wherein the UE requests urgent uplink synchronization acquisition.

\* \* \* \* \*